Nov. 17, 1936.  C. P. LEGGETT  2,061,472
PLOW AND EXTENSION SWEEP
Filed Aug. 4, 1936
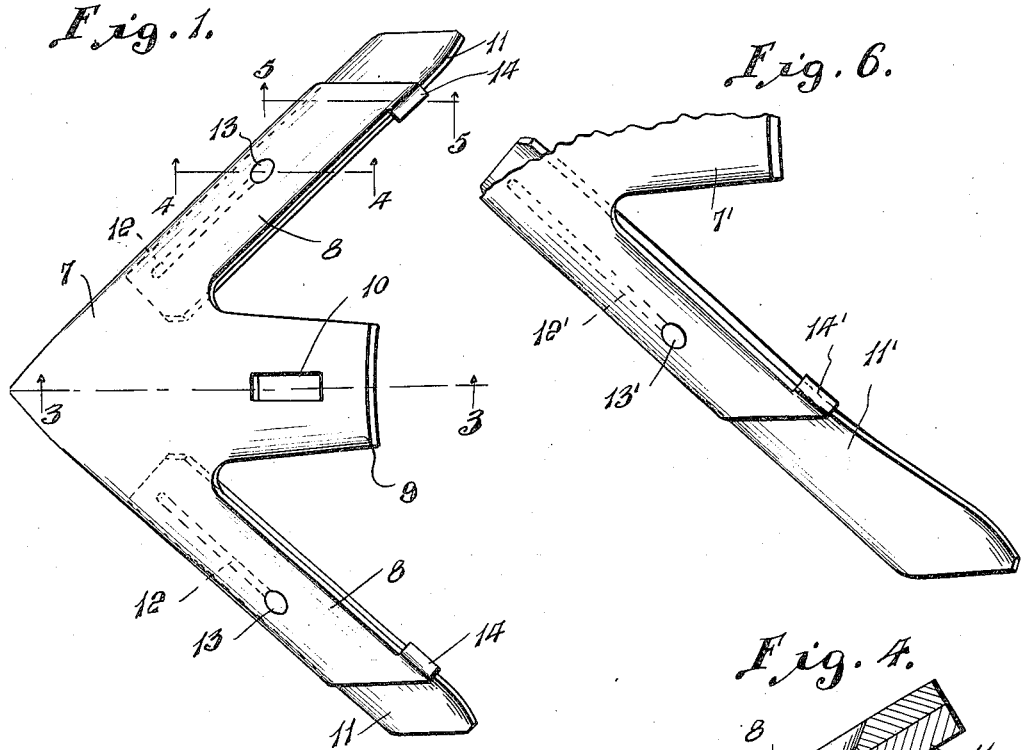
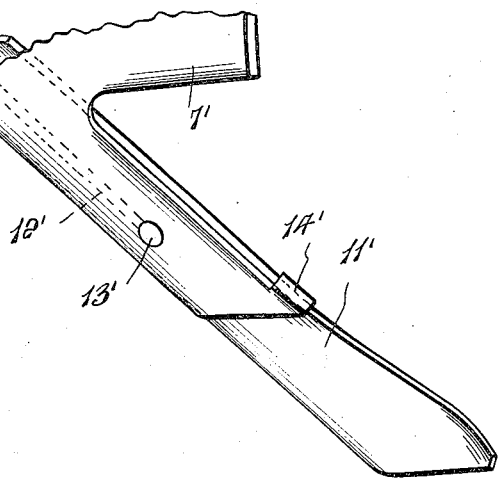
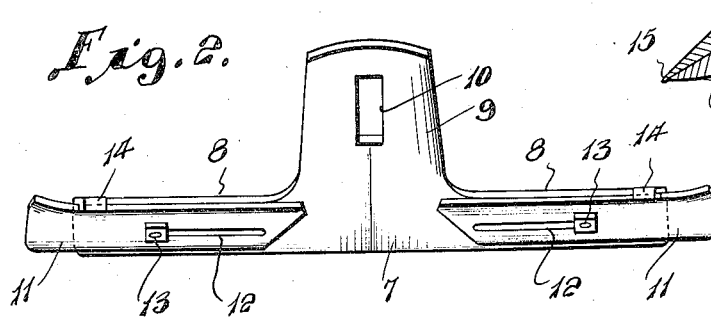
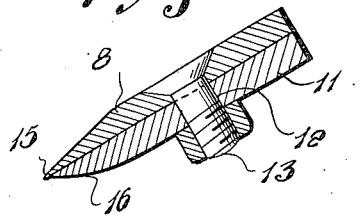
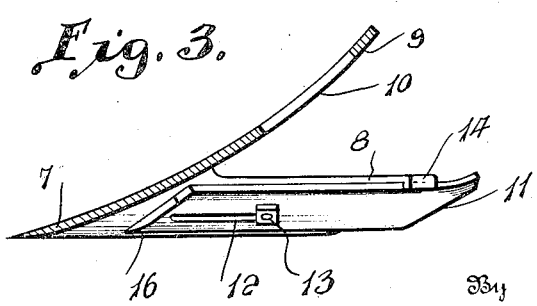
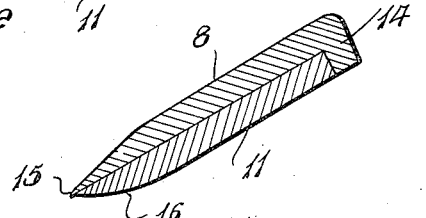
Inventor
C. P. Leggett
By L. F. Randolph
Attorney Patented Nov. 17, 1936

2,061,472

UNITED STATES PATENT OFFICE 2,061,472

PLOW AND EXTENSION SWEEP

Cohen P. Leggett, Rowland, N. C.

Application August 4, 1936, Serial No. 94,229

2 Claims. (Cl. 97—205)

This invention relates to a plow and extension sweep.

A particular object of the present invention is to provide a novel construction having wings which are mounted and adjustable so as to occupy various extended positions. Especially, it is an aim to provide a construction which is exceedingly simple and durable as well as efficent.

From the description hereinafter, considered with relation to the accompanying drawing, other objects and advantages will become apparent.

Briefly describing said drawing:—

Figure 1 is a plan view of the plow and extension sweep;

Figure 2 is a rear elevation thereof;

Figure 3 is a central longitudinal sectional view taken on the line 3—3 of Figure 1;

Figure 4 is a detail section taken on the line 4—4 of Figure 1;

Figure 5 is a detail section taken on the line 5—5 of Figure 1, and

Figure 6 is a fragmentary plan view showing the use of a more extended type of sweep.

In the drawing, a plow or sweep is shown at 7, its shape being conventional in that it is pointed and curved longitudinally and transversely as shown. Preferably it is made in a single piece and has wings 8 integral with it, located one at each side and extending angularly and rearwardly. On the sweep, a stub 9 is provided with has a slot 10 by means of which a fastening may be accommodated to secure the sweep to a beam or the like.

Wings 8 have extensions or adjustable wings 11 beneath and in the rear thereof, conforming generally in shape to the fixed wings at 8. Such adjustable wings have elongated slots 12 provided longitudinally thereof and through which detachable bolts 13 are passed as well as passed through the wings 8 to adjustably secure the extensions 11 in place. It will be noted that the slots 12 do not extend through the ends of the extension wings and hence the danger of detachment from the bolts is minimized. The structure also renders practical, the use of a single bolt for each extension wing 11 since lugs 14 overlap the extension wings 11, the lugs being provided at the upper outer corners of the fixed wings 8.

By reason of this construction, the extension sweeps 11, may be placed in any desired position with respect to the wings 8, through the adjustment of the bolts 13.

It will be noted that the lower edges of the sweeps 8 are chamfered or sharpened as at 15 and that the inner lower edges of the extension wings 11 are chamfered or sharpened as at 16. Since the wings 8 and 11 have flat face to face contact, the chamfered portions 15 and 16 provide a sharpened or cutting edge. It will be noted that the lugs 14 are formed integral with the wings 8 and may be expeditiously manufactured as a part thereof.

Obviously the wings 11 may be of any desired length or shape.

Those shown in Figures 1 to 5 are relatively short. Longer ones may be used as at 11' in Figure 6, the same extending practically to the point of the sweep. In this form, the sweep as a whole is designated 7', the bolt is shown at 13', the slot at 12' and the lug at 14', such parts 7', 11', 12', 13', and 14' corresponding with the parts 7, 11, 12, 13, and 14, respectively, of the preceding form of the invention.

Various changes may be resorted to provided they fall within the spirit and scope of the invention.

I claim as my invention:—

1. A plow and sweep of the class described having wings, extension wings engaging the undersurfaces of the first mentioned wings, bolts passing through the first mentioned wings and elongated slots of the second mentioned wings, said slots being disposed wholly between the ends of the second mentioned wings, and the first mentioned wings having lugs along one edge thereof abutted by the second mentioned wings and holding the latter against upward pivotal movement on the bolts.

2. A plow and sweep of the class described having wings, extension wings engaging the undersurfaces of the first mentioned wings, bolts passing through the first mentioned wings and elongated slots of the second mentioned wings, said slots being disposed wholly between the ends of the second mentioned wings, and the first mentioned wings having lugs along one edge thereof abutted by the second mentioned wings and holding the latter against upward pivotal movement on the bolts, said lugs being integral with the first mentioned wings, said first mentioned wings and second mentioned wings being beveled from opposite sides at their lower edges.

COHEN P. LEGGETT.